(12) United States Patent
Goldsmith et al.

(10) Patent No.: US 7,478,060 B2
(45) Date of Patent: Jan. 13, 2009

(54) ON-SITE E-COMMERCE PARTS ORDERING FROM PRODUCTS BEING SERVICED

(75) Inventors: Alan Goldsmith, Fairport, NY (US); Wilbert D. Douglas, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1445 days.

(21) Appl. No.: 09/943,613

(22) Filed: Aug. 30, 2001

(65) Prior Publication Data

US 2003/0046174 A1   Mar. 6, 2003

(51) Int. Cl.
*A01K 5/02* (2006.01)
*G06F 19/00* (2006.01)

(52) U.S. Cl. ............................. 705/29; 700/96; 707/102

(58) Field of Classification Search .................. 705/26, 705/8, 27, 22, 28, 29, 1, 15; 700/96; 707/102, 707/104, 2
See application file for complete search history.

(56) References Cited

U.S. PATENT DOCUMENTS

| | | | | |
|---|---|---|---|---|
| 4,404,639 | A * | 9/1983 | McGuire et al. ............... 701/35 |
| 4,694,408 | A * | 9/1987 | Zaleski ......................... 701/33 |
| 5,265,207 | A * | 11/1993 | Zak et al. ...................... 712/15 |
| 5,282,127 | A * | 1/1994 | Mii .............................. 700/1 |
| 5,432,904 | A * | 7/1995 | Wong ............................ 705/4 |
| 5,657,233 | A * | 8/1997 | Cherrington et al. ........ 705/400 |
| 5,664,110 | A | 9/1997 | Green et al. |
| 5,844,971 | A | 12/1998 | Elias et al. |
| 5,845,263 | A | 12/1998 | Camaisa et al. |
| 5,914,878 | A | 6/1999 | Yamamoto et al. |
| 6,134,557 | A | 10/2000 | Freeman |
| 6,212,256 | B1 * | 4/2001 | Miesbauer et al. ........... 378/118 |
| 6,311,162 | B1 * | 10/2001 | Reichwein et al. ............. 705/1 |
| 6,339,736 | B1 * | 1/2002 | Moskowitz et al. ........... 701/29 |
| 6,370,455 | B1 * | 4/2002 | Larson et al. ................. 701/33 |
| 6,487,479 | B1 * | 11/2002 | Nelson ......................... 701/29 |
| 6,609,050 | B2 * | 8/2003 | Li ............................... 701/29 |
| 6,798,997 | B1 * | 9/2004 | Hayward et al. .............. 399/12 |
| 6,810,406 | B2 * | 10/2004 | Schlabach et al. ........... 707/201 |
| 6,947,816 | B2 * | 9/2005 | Chen ........................... 701/33 |
| 6,959,235 | B1 * | 10/2005 | Abdel-Malek et al. ........ 701/33 |
| 6,965,806 | B2 * | 11/2005 | Eryurek et al. ................ 700/96 |
| 6,985,877 | B1 * | 1/2006 | Hayward et al. .............. 705/27 |
| 7,171,372 | B2 * | 1/2007 | Daniel et al. ................... 705/7 |
| 7,254,550 | B2 * | 8/2007 | Reichwein et al. ............ 705/26 |
| 7,266,515 | B2 * | 9/2007 | Costello et al. ............... 705/27 |

* cited by examiner

*Primary Examiner*—Thomas A Beach
(74) *Attorney, Agent, or Firm*—Fay Sharpe LLP

(57) ABSTRACT

A method for ordering parts for a machine being serviced within an e-commerce environment transmits diagnostic data from a local computing device at the machine to a host computing device via a network. A part to be replaced within the machine is identified as a function of the diagnostic data. A part identifier is determined as a function of the part and retrofit information stored on the host computing device. The part identifier is transmitted from the host computing device to an order processing device.

3 Claims, 2 Drawing Sheets

ON-SITE E-COMMERCE PARTS ORDERING FROM PRODUCTS BEING SERVICED

BACKGROUND OF THE INVENTION

The present invention relates to parts ordering systems. It finds particular application in conjunction with on-site parts ordering systems within an e-commerce environment and will be described with particular reference thereto. It will be appreciated, however, that the invention is also amenable to other like applications.

Large items (e.g., industrial products and/or machinery) are typically serviced on-site (i.e., in the field). During a service call, service technicians frequently discover that the products being serviced require replacement components. Conventionally, service personnel determine replacement components requirements according to service documentation repair procedures. The required part numbers are accessed from a parts list section included within the documentation. In some instances, when a machine's configuration has been altered due, for example, to retrofits, service personnel must determine which one of several similar, but functionally different, components are required. Typically, this involves reviewing change-tag information, which is included on a printed medium within the machine (e.g., attached as a label on an inner door panel). When a retrofit or configuration change is involved, the change-tag information label is manually scored once the parts are installed in order to keep track of the updated module hardware configuration.

Once the most current part number is identified, the parts order is transmitted (e.g., via telephone) to a distribution center. More specifically, the order is first transmitted to a local parts distribution center. If the part is not available locally, the order is forwarded to a regional distribution center. If the part is not available regionally, the order is then forwarded to a national distribution center. If the national distribution center does not have the part in stock, the part is retrieved from a manufacturing line. Once the part is found, the part is forwarded to the field for installation in the machine.

Traditionally, the service documentation repair procedures have been embodied in printed form (e.g., in a repair manual). Repair manuals, which include exploded views of each component and sub-component within a machine, are often times at least several inches thick. Determining a correct part number for a component to be replaced requires reviewing the exploded views within the repair manual to identify the component itself or a sub-assembly that includes the component. Next, the change-tag information is consulted for determining if the identified part number has become obsolete (e.g., the vendor supplying the part has changed) because a materials change was made (e.g., if the useful life of the part was not as long as expected), the vendor supplying the part changed, or the technology has been updated so that a different part is now being used. In some cases, one change precipitates another.

As one can easily imagine, the process described above may be time consuming while the potential for human-error is great. For example, it is not unforeseeable that the wrong part number is inadvertently identified by the technician within the exploded view of the machine. Furthermore, such a mistake may not be discovered until the part arrives at the site of the machine. In that case, the ordering process would need to begin again. Consequently, the down-time of the machine may be doubled. Additionally, the cost, in terms of both money and time, for maintaining the documentation, including the change-tag information, is substantial.

The present invention provides a new and improved apparatus and method which overcomes the above-referenced problems and others.

SUMMARY OF THE INVENTION

A method for ordering parts for a machine being serviced within an e-commerce environment transmits diagnostic data from a local computing device at the machine to a host computing device via a network. A part to be replaced within the machine is identified as a function of the diagnostic data. A part identifier is determined as a function of the part and retrofit information stored on the host computing device. The part identifier is transmitted from the host computing device to an order processing device.

In accordance with one aspect of the invention, if the part is included as a non-replaceable component in a replaceable sub-assembly within the machine, the identifying step includes identifying the part as the sub-assembly. If the part is a replaceable component within the machine, the identifying step includes identifying the part as the component.

In accordance with another aspect of the invention, other parts within the machine to be replaced are determined as a function of the part identifier.

In accordance with another aspect of the invention, an identifier of the machine is transmitted from the local computing device to a host computing device via the network. The part identifier and the retrofit information is identified as a function of the machine identifier.

In accordance with another aspect of the invention, the local computing device is a discrete unit from the machine. The local computing device is connected to the machine via a communication link.

In accordance with another aspect of the invention, the diagnostic data is stored within the local computing device.

In accordance with another aspect of the invention, a confirmation is transmitted to the local computing device that the part identifier has been transmitted to the order processing device.

In accordance with another aspect of the invention, the part is identified by viewing a graphical representation of the machine via a display device. The graphical representation is zoom-in via a pointing device.

One advantage of the present invention is that it increases the accuracy of the ordering process.

Another advantage of the present invention is that it increases the speed with which a part may be ordered.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
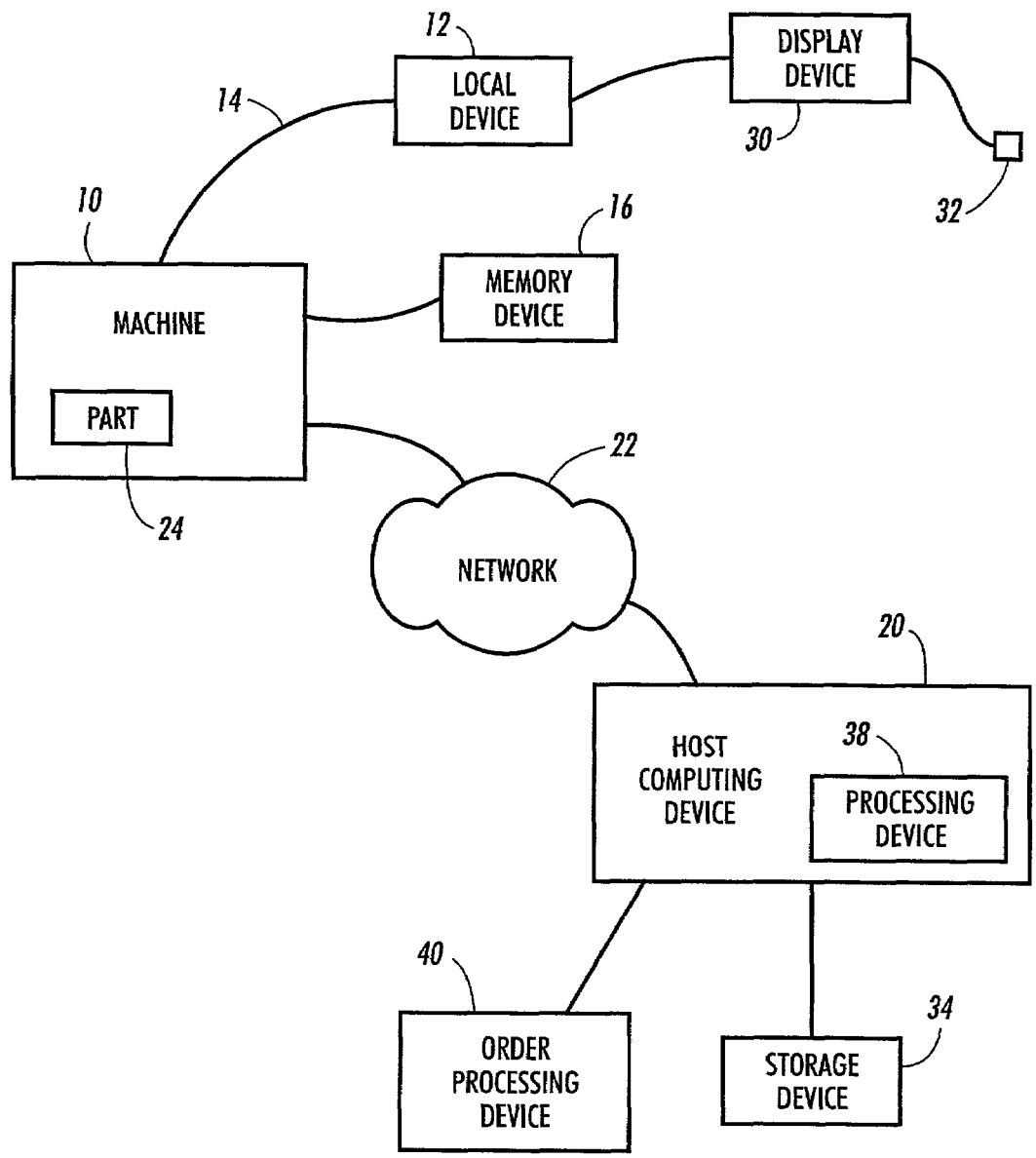
FIG. 1 illustrates a system according to the present invention.
Figure 2:
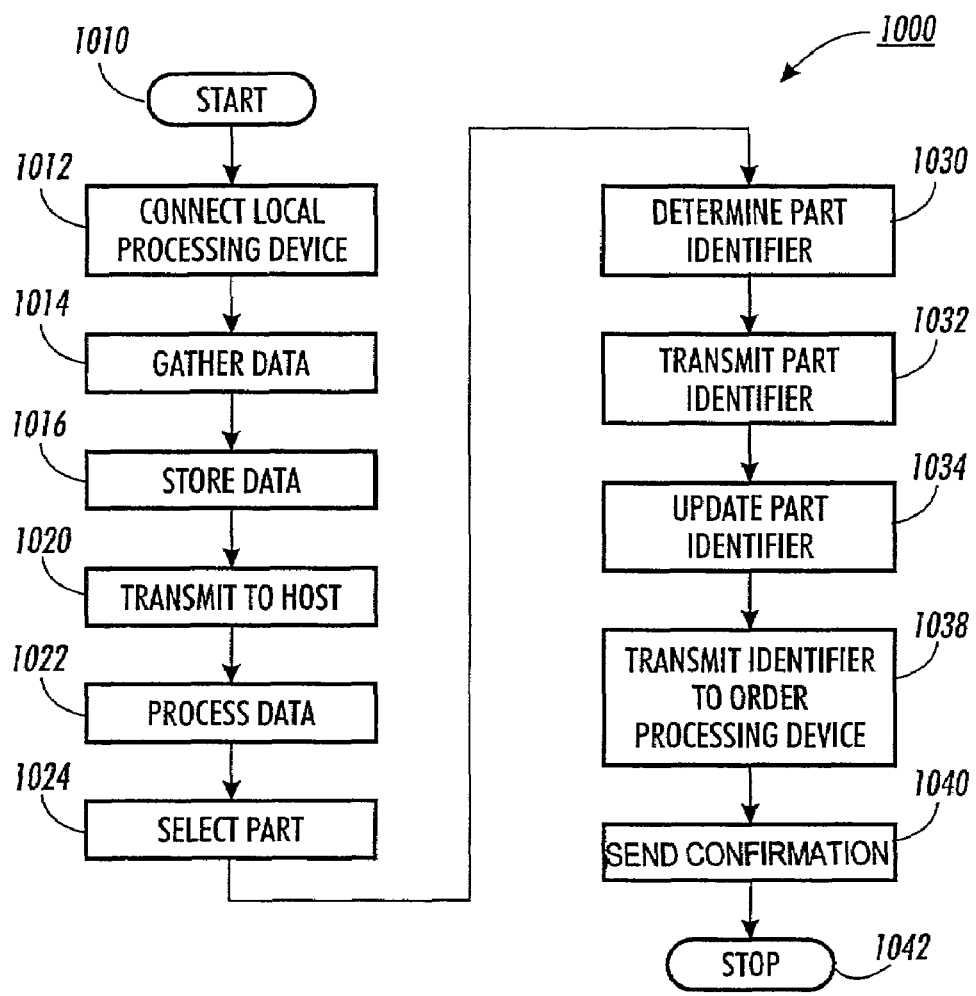
FIG. 2 illustrates a flowchart of the method according to the present invention.

With reference to FIGS. 1 and 2, a method 1000 to order parts for a machine 10 being serviced within an e-commerce environment begins in a step 1010. In the preferred embodiment, the machine 10 is a large-scale product used in a business environment. For example, it is contemplated that the machine 10 be a large-scale printer, copier, or other machine used in an office or an industrial environment. A local processing device 12 (e.g., a PC) is connected to the machine 10, in a step 1012, via a communication link 14. Although the local processing device 12 is described in the preferred embodiment as a discrete unit, it is also contemplated that the local processing device 12 be integrated into the machine 10.

Data used for diagnosing malfunctions in the operation of the machine 10 is gathered by the local processing device 12 in a step 1014. Optionally, the diagnostic data is stored, in a step 1016, in a memory device 16 that communicates with the local computing device 12. A machine identifier (e.g., a serial number) is determined within the local processing device 12. In the preferred embodiment, a user enters the serial number into the local processing device 12. Alternatively, it is contemplated that the serial number is "hard-wired" into the machine 10. In this case, the local processing device 12 reads the serial number from the machine 10. The local processing device 12 transmits the serial number and the diagnostic data to a host computing device 20 (central processing unit), in the step 1020, via a network 22 (e.g., an internet or intranet).

The diagnostic data is processed by the host computing device 20 in a step 1022. More specifically, the host computing device 20 runs tests using the diagnostic data to determine if any of the parts in the machine 10 are not functioning as expected. Alternatively, the user inspects the parts of the machine to identify parts that are in need of replacement.

Once a part 24 to be replaced is determined, an identifier of the part is determined. In the preferred embodiment, the part 24 is identified by viewing a graphical representation of the machine 10 on a display device 30 (e.g., a monitor). Then, via a pointing device 32 (e.g., a mouse), the user points to an area on the monitor 30 displaying a section of the machine 10 including the part 24. Once the pointing device 32 is positioned over the appropriate section of the machine 10, the user magnifies (zooms-in) that portion of the machine 10 by, for example, clicking a button on the mouse 32. The user repeats this process until the part 24 is magnified to a predetermined threshold level for showing a predetermined level of detail.

Once the part 24 is magnified to a predetermined level on the display device 30, the user selects, in a step 1024, the part 24 with the pointing device 32 (e.g., places a cursor over the part 24 using the pointing device 32 and then selects the part 24 by pressing a button on the pointing device 32). Once the part 24 is selected in the step 1024, a part identifier (e.g., part number) is determined in a step 1030. The part identifier is included within the data for the graphical representation of the machine 10. In the preferred embodiment, the data for the graphical representation of the machine 10, along with the data for the part identifiers, are stored locally in the memory device 16. However, it is also contemplated that the data be stored remotely in the host computing device 20. The identifier of the part 24 to be replaced is transmitted from the local processing device 12 to the host computing device 20 in a step 1032.

Retrofit information for each of the parts is maintained on a storage device 34, which communicates with the host computing device 20, as a function of the machine identifier. The retrofit information represents change-tag information (updated information) for determining if the part identifier determined in the step 1030 has become obsolete (e.g., the vendor supplying the part has changed and/or the technology has been updated so that a different part is now being used). The part identifier is updated, in a step 1034, as a function of the retrofit information. More specifically, a processing device 38, which communicates with the host computing device 20, determines whether any updated information is available for the part identifier. In other words, the part identifier determined in the step 1030 may or may not be replaced, in the step 1034, with an updated part identifier. The part identifier (i.e., updated part identifier) is then transmitted, in a step 1038, from the host computing device 20 to an order processing device 40. The order processing device 40 may be located at a local parts distribution center. If the part corresponding to the part identifier is available at the distribution center, the part is shipped to the location of the machine 10. Otherwise, the order is automatically forwarded to a regional and/or national distribution center.

Optionally, a confirmation that the part identifier has been sent to the order processing device 40 is transmitted to the local computing device 12 in a step 1040.

The process 1000 stops in a step 1042.

It is to be understood that the change-tag information maintained on the host computing device 20 also identifies other parts that are to be replaced along with the part 24. In other words, replacing one part in the machine 10 may precipitate changing another part. Any additional parts to be replaced are identified, in the step 1034, within the retrofit information as a function of the part 24 to be replaced.

The part 24 identified in the step 1024 may be a replaceable component within the machine 10. For example, the part may be a piece that is capable of being removed from the machine 10 and/or replaced as a discrete element. In this case, the part identifier represents the component to be replaced. Alternatively, the part 24 may be included as a non-replaceable component within a replaceable sub-assembly. In other words, the part 24 cannot be removed and/or replaced within the machine 10 without removing and/or replacing an entire sub-assembly. In this case, the part identifier represents the entire sub-assembly including the part 24 to be replaced.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method to order parts for a machine being serviced within an e-commerce environment comprising:
   connecting a machine to a local processing device via a communication link, the machine comprising a large-scale printer, copier or other machine;
   gathering diagnostic data used for diagnosing malfunctions in the operation of the machine by the local processing device, wherein the diagnostic data is stored in a memory device that communicates with the local processing device;

determining a machine identifier within the local processing device, wherein the determining a machine identifier comprises at least one of:
  (i) entering the machine identifier into the local processing device by a user; and
  (ii) reading the machine identifier from the machine when the machine identifier is hard-wired into the machine;
transmitting, by the local processing device, the machine identifier and the diagnostic data to a host computing device via a network;
processing the diagnostic data by the host computing device, wherein the processing the diagnostic data comprises at least one of:
  (i) running tests, by the host computing device, using the diagnostic data to determine if any parts of the machine are not functioning as expected; and
  (ii) inspecting the parts of the machine, by the user, to identify parts that are in need of replacement;
determining a part of the machine to be replaced, the part to be replaced comprising one of the parts not functioning as expected or one of the parts in need of replacement;
determining a part identifier of the part to be replaced, wherein the part to be replaced is identified by viewing a graphical representation of the machine on a display device, the determining a part identifier of the part to be replaced comprising:
  pointing by the user, via a pointing device, to an area on the display device displaying a section of the machine including the part to be replaced;
  when the pointing device is positioned over an appropriate section of the displayed section of the machine, magnifying, by the user, that portion of the machine, and repeating the pointing and magnifying process until the part to be replaced is magnified to a predetermined threshold level for showing a predetermined level of detail;
  when the part to be replaced is magnified to a predetermined level on the display device, selecting, by the user, the part to be replaced with the pointing device; and
  when the part to be replaced is selected, viewing the part identifier, wherein the part identifier is included within machine data for the graphical representation of the machine, and wherein the machine data is stored in at least one of:
    (i) the memory device that communicates with the local processing device; and
    (ii) in the host computing device;
transmitting the identifier of the part to be replaced from the local processing device to the host computing device;
maintaining retrofit information for each of the parts of the machine on a storage device which communicates with the host computing device, as a function of the machine identifier, wherein the retrofit information represents updated information for determining if the part identifier of the part to be replaced has become obsolete;
updating the part identifier of the part to be replaced as a function of the retrofit information, by a host processing device in communication with the host computing device, to determine whether any updated information is available for the part identifier, wherein the part identifier determined in the step of determining the part identifier of the part to be replaced may or may not be replaced with an updated part identifier; and
transmitting the updated part identifier from the host computing device to an order processing device, wherein, if a part corresponding to the updated part identifier is available at a distribution center, the part corresponding to the updated part identifier is shipped to a location of the machine, and wherein, if a part corresponding to the updated part identifier is not available at a distribution center, an order for the part corresponding to the updated part identifier is automatically forwarded to at least one of a regional and a national distribution center.

2. The method according to claim 1, wherein the updated information maintained on the host computing device also identifies other parts that are to be replaced along with the part to be replaced, and wherein replacing the part to be replaced precipitates changing at least one additional part of the machine, and any additional parts of the machine to be replaced are identified within the retrofit information as a function of the part identifier of the part to be replaced.

3. The method according to claim 1, wherein:
  if the part to be replaced is a replaceable component within the machine, wherein the part to be replaced is replaceable as a discrete element, the part identifier of the part to be replaced represents the replaceable component; and
  if the part to be replaced is a non-replaceable component within a sub-replaceable sub-assembly, wherein the part to be replaced cannot be removed and/or replaced within the machine without removing and/or replacing an entire assembly, the part identifier represents the entire sub-assembly including the part to be replaced.

* * * * *